United States Patent
Maack et al.

(10) Patent No.: US 11,773,572 B2
(45) Date of Patent: Oct. 3, 2023

(54) FROST PROTECTION APPARATUS FOR WATER SUPPLY APPARATUS IN RECREATIONAL VEHICLES

(71) Applicant: Truma Gerätetechnik GmbH & Co. KG, Putzbrunn (DE)

(72) Inventors: Frank Maack, Putzbrunn (DE); Michael Weber, Putzbrunn (DE)

(73) Assignee: Truma Gerätetechnik Gmbh & Co. KG, Putzbrunn (DE)

( * ) Notice: Subject to any disclaimer, the term of this patent is extended or adjusted under 35 U.S.C. 154(b) by 177 days.

(21) Appl. No.: 17/254,330

(22) PCT Filed: Jul. 1, 2019

(86) PCT No.: PCT/EP2019/067543
§ 371 (c)(1),
(2) Date: Dec. 21, 2020

(87) PCT Pub. No.: WO2020/007776
PCT Pub. Date: Jan. 9, 2020

(65) Prior Publication Data
US 2021/0214925 A1    Jul. 15, 2021

(30) Foreign Application Priority Data

Jul. 2, 2018   (DE) .................. 102018115980.3

(51) Int. Cl.
*E03B 7/10*    (2006.01)
*F16K 17/40*   (2006.01)
(Continued)

(52) U.S. Cl.
CPC .............. *E03B 7/10* (2013.01); *F16K 17/403* (2013.01); *F24D 3/1008* (2013.01);
(Continued)

(58) Field of Classification Search
CPC .......... E03B 7/10; F16K 17/403; F24H 1/009; F24D 3/1091; F24D 3/1008; F24D 19/0095
(Continued)

(56) References Cited

U.S. PATENT DOCUMENTS 3,567,245 A * 3/1971 Ekstrom ............... B60R 21/268
                                                  220/261
3,658,206 A * 4/1972 Barbier ................... F24H 3/004
                                                  220/89.2
(Continued)

FOREIGN PATENT DOCUMENTS

CN    104279612 A    1/2015
CN    107131780 A    9/2017
(Continued)

*Primary Examiner* — Minh Q Le
(74) *Attorney, Agent, or Firm* — Murphy, Bilak & Homiller, PLLC

(57) ABSTRACT

Specified is a water supply apparatus, a mixing apparatus (1) being provided for mixing, in a mixing container (3), water conveyed in the mixing apparatus (1). Arranged relative to the mixing container (3) is a base apparatus (2) which has a base chamber (9) that is hydraulically connected to a water pipe (11, 12, 13) of the water supply apparatus and has an opening to the surroundings. A sealing device (10) is installed in the base chamber (9) for the purpose of closing off the opening of the base chamber (9) from the surroundings. The sealing device (10) has a weak point wall region (17) whose pressure strength is lower than the pressure strength of wall regions of all the other components of the water supply apparatus which, in the operating state, enclose cavities that can be filled with water, and which separate these cavities that can be filled with water from the surroundings.

10 Claims, 2 Drawing Sheets

(51) Int. Cl.
*F24H 1/00* (2022.01)
*F24D 3/10* (2006.01)
*F24D 19/00* (2006.01)

(52) U.S. Cl.
CPC ........ *F24D 3/1091* (2013.01); *F24D 19/0095* (2013.01); *F24H 1/009* (2013.01)

(58) Field of Classification Search
USPC ......... 137/68.11, 68.19, 68.23, 68.27, 68.28, 137/456, 461
See application file for complete search history.

(56) References Cited

U.S. PATENT DOCUMENTS

| | | | | |
|---|---|---|---|---|
| 3,794,242 A * | 2/1974 | Hagdorn | ............... | B60H 1/2209 237/66 |
| 4,326,589 A * | 4/1982 | Ballman | ................ | A62C 35/60 169/5 |
| 4,416,388 A * | 11/1983 | Mulawski | ............. | F17C 13/123 222/397 |
| 4,576,303 A * | 3/1986 | Mundt | .................... | B05B 15/14 220/89.2 |
| 6,588,377 B1 * | 7/2003 | Leary | ..................... | E03B 1/048 122/13.3 |
| 7,051,751 B2 * | 5/2006 | Carroll | .................... | F16K 17/16 137/68.19 |
| 9,145,663 B1 * | 9/2015 | Hoeptner | ................. | E03B 9/04 |
| 10,465,812 B2 * | 11/2019 | Moro-Le Gall | ........ | F16K 17/16 |
| 2002/0166583 A1 * | 11/2002 | Christenson | ........... | A62C 3/004 137/68.19 |
| 2015/0013781 A1 * | 1/2015 | Wickelmaier | ......... | F24D 3/1008 137/896 |
| 2018/0223506 A1 * | 8/2018 | Harb | ........................ | E03B 7/12 |
| 2021/0214925 A1 | 7/2021 | Maack et al. | | |

FOREIGN PATENT DOCUMENTS

| | | |
|---|---|---|
| DE | 2116046 A1 | 12/1971 |
| DE | 02013006209 U1 | 7/2013 |
| DE | 202013006208 U1 | 7/2013 |
| DE | 202013006209 U1 | 7/2013 |
| EP | 0684429 A1 | 11/1995 |
| EP | 2607811 A2 | 6/2013 |
| GB | 1221254 A | 2/1971 |

\* cited by examiner

A-A

FROST PROTECTION APPARATUS FOR WATER SUPPLY APPARATUS IN RECREATIONAL VEHICLES

The invention pertains to a water supply apparatus, in particular, a water supply apparatus for recreational vehicles.

Such water supply apparatus are, for example, equipped with a water heater, which can be designed as a flow heater and is used to heat water for sanitary purposes. Usually, such a water heater has a heat source, for example, a gas burner or an electric heater, as well as a heat exchanger. The heat exchanger is heated by the heat source and the water flows through it, whereby the water is heated.

The heating of the water within the heat exchanger can be subject to certain fluctuations, for example, through cyclical operation of the heat source, in particular, in the case of a gas burner. Accordingly, during the operation of such a water heater, fluctuations of the outlet temperature may also occur at the taps. In this process, especially outlet temperature peaks are unpleasant for the user since they may come into contact with water that is too hot.

To solve this problem, DE 20 2013 006 208 U1 describes a pressure equalization and mixing apparatus with which it is possible to subsequently mix the water heated by the water heater. In this manner, it can be achieved that locally hotter water is mixed with cooler water present in the system (e.g., the mixing apparatus), so that on the whole the temperature is homogenized. In particular, the mixing apparatus provides a mixing container in which the water that has previously passed through the water heater is mixed.

In addition, a pressure equalization device can be provided according to DE 20 2013 006 208 U1 which limits the pressure in the water to avoid damage to the components of the water supply device. Limiting or harmonizing the pressure can, for example, be convenient to compensate for pressure peaks occurring during strong heating of the water. Especially when the water volume is low throughout, stronger heating of the water may result in a corresponding expansion and thus to a strong increase in pressure which is compensated for by the pressure equalization device described in DE 20 2013 006 208 U1.

The pressure equalization device thus previously known from DE 20 2013 006 208 U1 has proven itself excellently in practice and has increased the comfort for the user through equal supply with warm water.

The water provision apparatus can, in particular, be used in recreational vehicles such as motorhomes etc. to enable comfortable provision of warm water. For such recreational vehicles it is common to discharge the water from the entire water supply device prior to the beginning of the cold season to prevent the system from freezing. In case that the water still present in the system freezes, there is a risk that damage to the system (of the water supply apparatus) is effected due to the frost-related expansion of the frozen water (ice formation). For example, cavities, conduits, connections, etc. can burst due to the formation of ice.

Therefore, the users of such systems are used to discharge the water if it must be feared that the system or the recreational vehicle is exposed to frost.

However, if the user fails to completely discharge the water, there is a risk that, due to the subsequent freezing of the water still present in the system, a damage is caused which may require correspondingly expensive repair and exchange work.

The invention is based on the object to provide a water supply apparatus where possible damage due to freezing of the water still present in the system is kept as low as possible.

The object is, in accordance with the invention, solved by a water supply apparatus with the features of claim 1. Embodiments of the invention are stated in the dependent claims.

A water supply apparatus is stated, wherein a mixing apparatus is provided for mixing, in a mixing container, water carried in the mixing apparatus. Relative to the mixing container, a base apparatus is arranged, which has a base chamber that is hydraulically connected to a water conduit of the water supply device and has an opening to the surroundings. A sealing device is installed in the base chamber for closing off the opening of the base chamber from the surroundings. The sealing device has a wall area with predetermined breaking point which has a compressive strength that is lower than the compressive strength of wall areas of other components of the water supply apparatus which, in the operating state, enclose cavities that can be filled with water, and which separate these cavities that can be filled with water from the surroundings.

The sealing device can, for example, depending on the design in conjunction with additional components such as sealing elements (e.g., at least one O-ring or at least one sealing molded part), serve to seal the base chamber from the surroundings in a state installed in the base chamber.

In particular, the base apparatus can be arranged underneath the mixing container.

In particular, the compressive strength of the wall area with predetermined breaking point can even be lower than the compressive strength of wall areas of all other water carrying components of the water supply apparatus.

The mixing apparatus can, in particular, be a mixing apparatus as described in DE 20 2013 006 208 U1. For example, the base apparatus with the base chamber can be provided underneath the mixing container, i.e. at a lower-lying level. Accordingly, there is a high probability that water which is still in the water supply apparatus, e.g., when the water is discharged, anyway also collects in the base chamber which, accordingly, is connected to a water conduit of the water apparatus.

The base chamber itself is open to the surroundings. This opening is closed by the sealing device, so that the base chamber, in the operating state, is closed off from the surroundings.

The sealing device can, in particular, serve as a "plug" for closing the base chamber and thus the water supply apparatus. When removing the sealing device from the base chamber and thus releasing the opening of the base chamber, the water present in the water supply apparatus can flow out into the surroundings via the base chamber. Corresponding conduits or water guides can be provided to ensure proper drainage of the water. In this manner, the water can be intentionally discharged from the water supply apparatus before the beginning of a frost period. Thereafter, the sealing device can be re-installed in the base chamber to close the base chamber again. Since, however, in particular, in the case of a drainage time that is too short, water can still flow into the base chamber, there is, despite predominant depletion of the water supply apparatus, still the risk of a frost damage if this residual water collecting in the base chamber freezes in the case of frost.

To solve this problem, the wall area with predetermined breaking point is provided in the sealing device which has a low compressive strength. Should therefore a correspondingly high pressure form within the base chamber and thus within the water supply apparatus, for example, through freezing of the water and ice formation associated therewith, breaking of the wall area with predetermined breaking point can deliberately be achieved since the other components of the water supply apparatus have a higher strength. The latter especially applies to the wall areas of the components which carry water in cavities (conduits, chambers, etc.) and separate these cavities from the surroundings. These wall areas are, as a matter of principle, endangered if the water freezes.

After breaking of the wall area with predetermined breaking point, the base chamber is open to the surroundings again, so that the water or ice present within the base chamber can extend to the surroundings, whereby a further increase of pressure and thus possibly the destruction of additional components is prevented.

The mentioned water conduit of the water supply apparatus can, for example, comprise a connection to a storage tank of the recreational vehicle or to a public water supply network. However, similarly it is also possible that the water conduit takes over other functions. For example, the water conduit can lead to or from the water heater (heat exchanger) or to a consumer.

Thus, the wall area with predetermined breaking point in the sealing device serves to prevent frost damage or provides frost protection.

The strength criterion of "compressive strength" can also be understood as breaking strength. In this process, the compressive strength or breaking strength is, in particular, dependent on the wall strength and the wall material. A low breaking or compressive strength can also be achieved by local measures, for example, by a purposeful weakening of the material in the area of the wall area with predetermined breaking point.

In particular, the wall area with predetermined breaking point can be designed as a partition wall between the inside of the water supply apparatus (here: the base chamber) and the surroundings.

The wall area with predetermined breaking point can be dimensioned in such a manner that when at least one of the cavities of the water supply apparatus is filled with freezing water, the wall area with predetermined breaking point will break before another component of the water supply apparatus breaks. In this manner, it can be achieved by the "sacrifice" of the wall area with predetermined breaking point that the damage remains relatively small as other components are protected, the exchange or repair of which would possibly be significantly more elaborate and expensive.

The mixing container can enclose a mixing chamber, wherein, in the bottom area of the mixing chamber, an opening can be provided which connects the mixing chamber to the base chamber, and wherein, when the sealing device is installed, the opening to the base chamber is closed. The water from the mixing chamber can then be discharged via the opening and the base chamber if the sealing device is removed. Through the sealing device alone (due to the shape of the sealing device) or in connection with sealing elements, e.g., O-rings or molded seals, the opening can, when the sealing device is installed, be especially tightly sealed to the base chamber.

The sealing device can be exchangeably installed in the base chamber. In this process, the sealing device should, in particular, be non-destructively exchangeable, for example, insertable similar to a plug. Seals can be provided on the sealing device to seal the joints between the sealing device and the base chamber when the sealing device is inserted.

The sealing device can include a filter seat to accommodate and hold a water filter. Thus, it is possible to especially hold the water filter within a water stream which, for example, is introduced into the water supply apparatus from outside. The water filter can, for example, be provided in the form of cartridges, tablets, etc. The water quality can be improved by flowing through the water filter.

The base apparatus can have an inlet and an outlet for routing water through the base chamber. In addition, a filter chamber can be provided, which, in the base apparatus, is flow-wise arranged between the inlet and the outlet and forms part of the base chamber. In this process, the filter seat can be arranged within the filter chamber in such a manner that the water filter accommodated by the filter seat is held within the filter chamber. The water flowing through the filter chamber and the filter seat then flows through the water filter. The water, in turn, can be drawn from the public network via a conduit or from a storage container. In addition, the filter chamber can have lateral apertures or recesses through which the water can pass.

In one embodiment, the wall area with predetermined breaking point is provided adjacent to the filter seat.

In one embodiment, the sealing device has an elongated extension, as well as, additionally to the filter seat, an environmental chamber open to the surroundings which is coaxial to the filter seat in the longitudinal direction. In this process, the wall area with predetermined breaking point can be arranged between the filter seat and the environmental chamber. Thus, the elongated extension of the sealing device enables an axial arrangement of the filter seat and of the environmental chamber, with the wall area with predetermined breaking point being axially arranged in between. In this process, the so-called environmental chamber need not be a large-volume chamber. It also can directly form the external wall which, in this case, is identical to the wall area with predetermined breaking point.

The filter seat can have a cylindrical form. In this process, the base area of the cylinder can be circular, oval or polygonal. Furthermore, the wall area with predetermined breaking point can form a front side of the cylindrical filter seat. Thus, the wall area with predetermined breaking point can, for example, be circular or oval. In addition, the wall area with predetermined breaking point can be an intermediate or transition component to which, e.g., another section of the sealing device (e.g., the aforementioned environmental chamber) is connected. The cylindrical form has, for example, the advantage that ice will primarily form along a longitudinal axis of the cylinder and therefore preferably hit against the front-side wall area with predetermined breaking point.

The wall area with predetermined breaking point can have a weakening which can take the form of being a reduced wall strength in relation to the wall strengths of the other sections that form the filter seat or enclose this associated seat space. Therefore, the wall area with predetermined breaking point can take the form of the wall strength being purposefully reduced at a point. In one variant, the weakening surrounds the front side and/or the weakening is part of the front side of the cylindrical filter seat.

The sealing device can, in particular, be of a single-piece design. For example, it can be a plastic part, a plastic injection molded part, etc.

If plastic is used as material, then the aforementioned weakening will, for example, be directly created during molding, or material is—subsequently—purposefully removed mechanically or through heat in the area of the weakening.

In one variant, the sealing device can be of a multi-piece design, wherein the wall area with predetermined breaking point is combined with additional components to form the sealing device. In particular, for example, a plurality of bushes or hollow elements can be screwed or plugged together and, in this process, enclose the wall area with predetermined breaking point between them. The wall area with predetermined breaking point can then be exchangeably installed in the sealing device. In this manner, the wall area with predetermined breaking point can be designed in the style of an installed bursting disk.

The mixing apparatus can, in particular, be a pressure equalization and mixing apparatus, wherein the pressure equalization and mixing apparatus has a mixing device and a pressure equalization device. The mixing device can serve to mix the water carried in the mixing device, while the pressure equalization device can serve to restrict the increase of pressure in the water. The mixing device and the pressure equalization device can be integrated in a container unit and have a common housing absorbing and carrying the water. An example of such a pressure equalization and mixing apparatus is described in DE 20 2013 006 208 U1. The mixing device is designed as a rotational mixing device therein.

The pressure equalization device can be arranged at least partly within the mixing device, wherein the mixing device has a water absorbing mixing volume and the pressure equalization device has an air absorbing pressure equalization volume. In this process, the mixing volume and the pressure equalization volume can be adjacent to one another and are at least partly separated from one another by a common partition wall.

The sealing device can partly or completely consist of plastic.

Furthermore, the sealing device can be made from a temperature resistant and/or a drinking water suitable material or have at least a drinking water suitable surface.

The wall area with predetermined breaking point can have a compressive strength of up to a maximum range between 2400 kPA and 3500 kPA. Thus, the wall area with predetermined breaking point resists, for example, pressures of up to a range between 2400 kPA and 3500 kPA.

For the design of the wall area with predetermined breaking point, different possibilities are conceivable. For example, the wall area with predetermined breaking point can have a weakening in the form of a reduced wall strength compared to other sections forming the sealing device, wherein the wall area with predetermined breaking point can be dimensioned in such a manner that the weakening has a lower compressive strength than all other water carrying components of the water supply apparatus.

In this process, the wall area with predetermined breaking point can have a wall element, wherein the weakening in one variant can have a groove which completely circulates the wall element.

In another variant, the weakening can have a groove, which circulates the wall element only partially, in such a manner that the wall element is connected to an area of the sealing device surrounding the wall area with predetermined breaking point via a bar. The bar, on one hand, can serve to hold the wall element on the remaining sealing device when the wall area with predetermined breaking point breaks. On the other hand, the bar enables, in a case in which the sealing device is manufactured as a plastic injection molded part, that the flowable plastic can flow better during the manufacture of the component.

These and additional advantages and features are explained in more detail in the following text, based on an example with the aid of the accompanying figures, in which:

FIG. 1 shows a water supply apparatus according to the invention. The water supply apparatus can be part of a larger system which, amongst others, can, for example, include a water heater (electrical or gas), as well as corresponding conduits, heat exchangers, etc.

Figure 1:
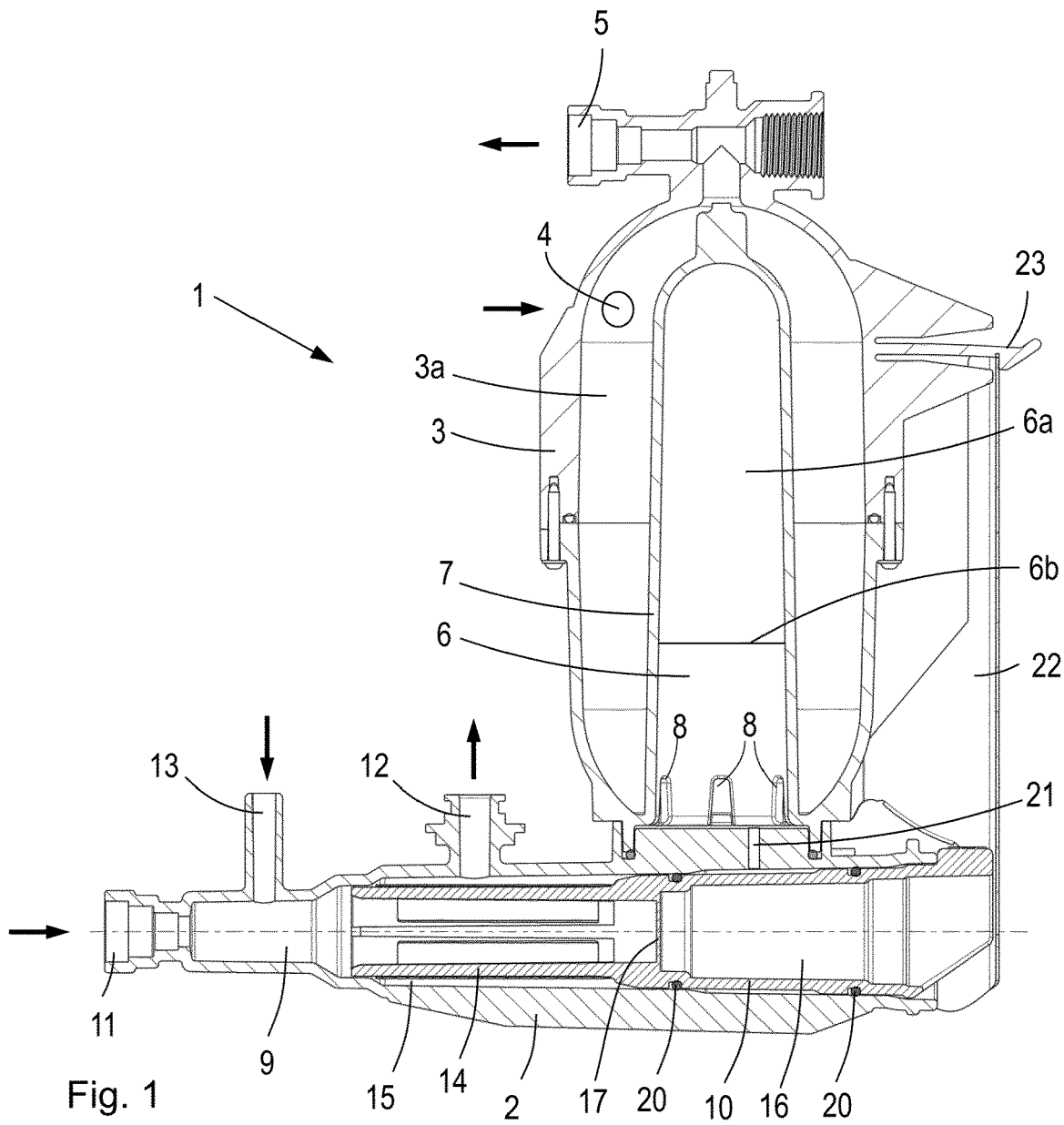
FIG. 1 shows a section through an example of a water supply apparatus with a mixing apparatus.

The water supply apparatus to be explained herein includes, in particular, a mixing apparatus 1 designed as a pressure equalization and mixing apparatus, as well as a base apparatus 2 arranged underneath the mixing apparatus 1.

The mixing apparatus 1 includes a mixing container 3 with an inlet 4 and an outlet 5. The inlet 4 is provided in the upper area of the mixing container 3, with the inlet 4 being arranged tangentially, so that water inflowing via the inlet 4 follows a swirling or spiral current within the mixing container 3. The arrows symbolize the flow direction of the water at the inlet 4 and the outlet 5.

The mixing container 3 encloses a mixing chamber 3a. A pressure equalization device 6, which includes a cupola or dome-like wall 7, is provided within the mixing chamber 3a. The wall 7 is closed upward while it has openings 8 in the bottom area via which the interior of the wall 7 is in communication with the interior of the mixing container 3 or of the mixing chamber 3a.

If water is let in via the inlet 4, air becomes entrapped inside the wall 7 and increasingly compressed in the case of increasing water pressure. Due to the dome-like structure of the wall 7, the air cannot escape so that an entrapped air volume 6a forms above a water level 6b. In this manner, volume compensation is possible in the case of fluctuating water pressures which leads to homogenization of the pressure and, in particular, to a reduction of pressure peaks.

The operating principle of the pressure equalization device 6 is described in detail in DE 20 2013 006 208 U1, so that a detailed discussion at this point is unnecessary.

The water entering via the inlet 4 flows around the dome-like wall 7 in a swirling or spiral manner and is equally mixed, which leads to homogenization of the temperature. The mixed water then exits the mixing chamber 3a vertically upwards via the outlet 5 and can be routed to a consumer via a conduit not shown.

The base apparatus 2 placed underneath the mixing container 3 includes a large base chamber 9 into which a longitudinal sealing device 10 is inserted to close the base chamber 9 from the surroundings. The base chamber 9 is connected to water carrying components via various openings. For example, a water inlet 11 is provided frontal to the base chamber, via which water from a fresh water tank or the public network can flow into the base chamber 9 (cf. direction of arrow). The water is subsequently discharged again via a water outlet 12 and, for example, guided to a heat exchanger (not shown) as part of a water heater (also not shown), where the water can subsequently be heated. Having passed the heat exchanger, the heated water then reaches the mixing container 3 via the inlet 4, is mixed in the mixing chamber 3a and discharged via the outlet 5, so that it can finally reach the consumer, e.g., a shower in a recreational vehicle.

Furthermore, a feedback inlet 13 is provided on the base chamber 9, via which water can be returned in a circulation mode.

Thus, water flows through the base apparatus 2 with the base chamber 9 in the operating state.

Figure 2:
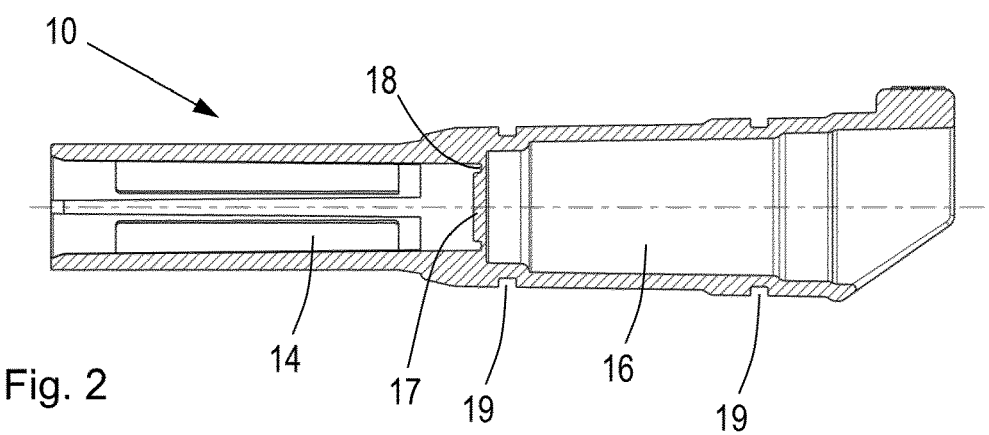
FIG. 2 shows a section through a sealing device which can be installed in the water supply apparatus of FIG. 1.

FIG. 2 shows the sealing device 10 as an individual component. The sealing device 10 essentially has a cylindrical form. In particular, the section shown on the left-hand side in the representation is cylindrical.

A filter seat 14 is formed on a front side of the sealing device 10, into which a water filter, for example, a filter cartridge or filter tablets can be inserted. For better representation, the water filter or the filter elements are not shown in the figures.

The sealing device 10 with the filter seat 14 is dimensioned in such a manner that the filter seat 14 holds the water filter within a filter chamber 15 which, in turn, is part of the base chamber 9 (FIG. 1). Thus, the sealing device 10 holds the water filter at the place envisaged (filter chamber 15) within the base chamber 9.

Frontal to the filter seat 14, an environmental chamber 16 is designed within the sealing device 10 which is open to the surroundings. The environmental chamber 16 has a relatively large size in the example shown. However, it can also be designed essentially smaller. In a variant of the sealing device 10 not shown, the environmental chamber 16 is not present at all, so that the outside of the sealing device 10 directed to the surroundings is essentially flush.

Between the filter seat 14 and the environmental chamber 16, a wall area with predetermined breaking point 17 is provided, which thus separates the interior of the base apparatus 2, namely the base chamber 9 with the filter chamber 15, from the environmental chamber 16 and thus from the surroundings. The wall area with predetermined breaking point 17 thus forms a partition wall between the base chamber 9 and the surroundings.

The wall area with predetermined breaking point 17 is plotted in FIG. 1 as a uniform thin wall element.

In contrast, FIG. 2 shows a variant where the wall area with predetermined breaking point 17 has a specific annular weakening 18.

In both cases, the wall area with predetermined breaking point 17 has a compressive strength which is lower than that of the other components exposed to water. The wall strength of the wall area with predetermined breaking point 17 is accordingly low at the weakest point. In one embodiment, the wall area with predetermined breaking point 17 tolerates pressures of up to a range between 2400 kPA and 3500 kPA.

Between the interior of the mixing container 3 or of the mixing chamber 3a and of the base chamber 9, a connecting opening 21 is provided via which the water from the mixing chamber 3a can flow off into the base chamber 9. This connecting opening 21 is especially helpful to be able to fully discharge the water when the system is put out of operation to prevent subsequent freezing of water.

The sealing device 10 has two circumferential grooves 19 into which O-rings 20 can be inserted. The grooves 19 or O-rings 20 are dimensioned in such a manner that a sealing effect is achieved when sliding the sealing device 10 into the base chamber 9. That way, when the sealing device 10 is inserted, neither water from the base chamber 9 nor water from the mixing container 3 (via the connecting opening 21) can exit.

Thus, when the sealing device 10 is slid into the base chamber 9, also the connecting opening 21 between the mixing container 3 and the base chamber 9 is closed. If, however, the sealing device 10 is extracted from the base chamber 9, all of the water can flow out from the base chamber 9. In addition, also the water still present in the mixing container 3 can be discharged via the connecting opening 21 and flow off to the surroundings.

For easier extraction of the sealing device 10, a lever 22 is provided which, in turn, is secured against unintentional loosening by a bolt 23. In FIG. 1, the lever 22 is shown in the closed position. If the lever 22 is swung downwards, the sealing device 10 connected to the lever 22 is extracted from the base chamber 9 and can subsequently be easily removed. The water present within the base chamber 9 or the additional system will then flow out.

Conversely, a sealing device 10 newly inserted into the base chamber 9 can be moved into its intended position by swinging the lever 22 upwards to seal the base chamber 9 from the surroundings.

Due to the dimensioning or weakening of the wall area with predetermined breaking point 17, it can be achieved that it acts similar to a bursting disk. If the internal pressure within the base chamber 9 is increased, for example, through the increase in volume of freezing water, the wall area with predetermined breaking point 17 can break when the compressive strength of the wall area with predetermined breaking point 17 is exceeded, whereby the pressure can be released to the surroundings. In particular, the freezing or already frozen water can extend towards the surroundings. Thus, the wall area with predetermined breaking point 17 serves as a "sacrifice" to protect other components from frost damage.

Then, as a repair measure, only the sealing device 10 must be exchanged. The risk of further frost damage to components of the water supply apparatus, but also in the whole additional system is significantly reduced. This applies, in particular, if the base chamber 9 is located at the deepest level of the whole system, so that all water or residual water will collect in the base chamber 9.

Figure 3A:
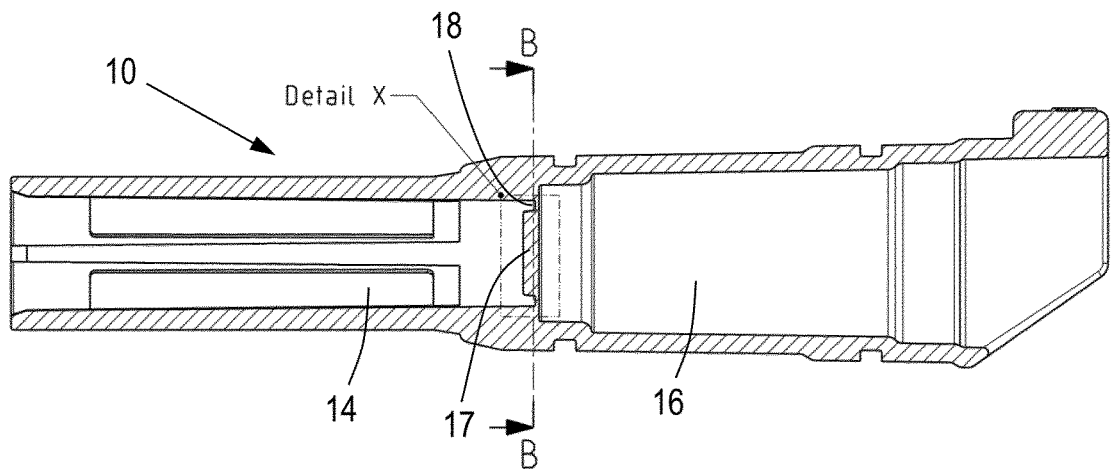
FIG. 3 shows a variant with another design of a wall area with predetermined breaking point.
Figure 3B:
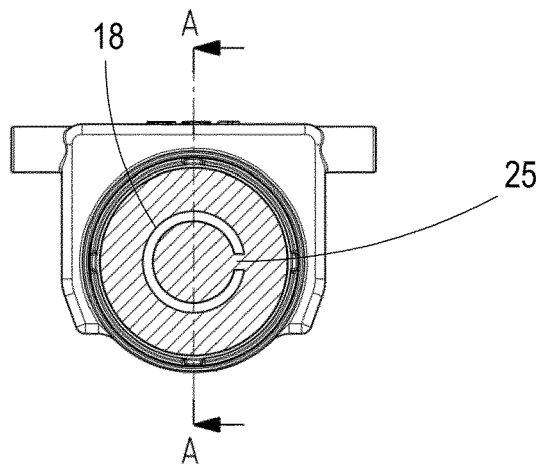
Figure 3C:
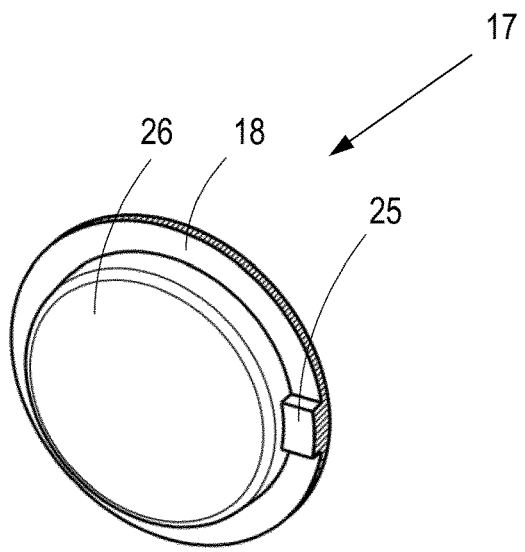

FIG. 3 shows, compared to FIG. 2, a variant of a design of the wall area with predetermined breaking point 17. In this process, FIG. 3a shows a longitudinal section analog to FIG. 2. FIG. 3b shows a vertical section along the line B-B in FIG. 3a. FIG. 3c shows the detail marked with X in FIG. 3a in a perspective view.

While in the variant of FIG. 2, the weakening 18 is designed as a circumferential groove, the weakening 18 is designed as a partially circumferential groove only in the variant of FIG. 3. In the area in which the weakening 18 does not circulate as a groove, a bar 25 is formed. In this process, the wall area with predetermined breaking point 17 is formed by the weakening 18, the bar 25 and a wall element 26 circulated by the weakening 18 (FIG. 3c).

The bar 25 enables that, when the sealing device 10 is manufactured as a plastic injection molded part, flowable plastic can reliably flow also into the area of the wall area with predetermined breaking point 17. The area of the weakening 18 could possibly have a cross section too small to enable the requested plastic flow there.

In addition, the bar 25 can effect that, in the case of a non-desired increase in pressure, the wall area with predetermined breaking point 17 does not fully break out from the sealing device 10, but is held on the sealing device 10 by the bar 25. The material can break up on the remaining groove forming the weakening 18, and the pressure can escape.

The invention claimed is:

1. A water supply apparatus, comprising:
a mixing apparatus configured to mix, in a mixing container, water carried in the mixing apparatus;
a base apparatus having a base chamber that is hydraulically connected to a water conduit of the water supply apparatus and which has an opening to the surroundings; and
a sealing device installed in the base chamber and configured to close off the opening of the base chamber from the surroundings,
wherein the sealing device has a wall area with a predetermined breaking point which has a compressive strength that is lower than the compressive strength of wall areas of other components of the water supply apparatus which, in an operating state, enclose cavities that can be filled with water, and which separate the cavities that can be filled with water from the surroundings,
wherein the wall area with the predetermined breaking point is dimensioned such that when at least one of the cavities of the water supply apparatus is filled with freezing water, the wall area with the predetermined breaking point breaks before another component of the water supply apparatus breaks.

2. A water supply apparatus, comprising:
a mixing apparatus configured to mix, in a mixing container, water carried in the mixing apparatus;
a base apparatus having a base chamber that is hydraulically connected to a water conduit of the water supply apparatus and which has an opening to the surroundings; and
a sealing device installed in the base chamber and configured to close off the opening of the base chamber from the surroundings,
wherein the sealing device has a wall area with a predetermined breaking point which has a compressive strength that is lower than the compressive strength of wall areas of other components of the water supply apparatus which, in an operating state, enclose cavities that can be filled with water, and which separate the cavities that can be filled with water from the surroundings,
wherein the mixing container encloses a mixing chamber,
wherein an opening is provided in a bottom area of the mixing chamber and which connects the mixing chamber to the base chamber, and
wherein when the sealing device is installed, the opening to the base chamber is closed.

3. A water supply apparatus, comprising:
a mixing apparatus configured to mix, in a mixing container, water carried in the mixing apparatus;
a base apparatus having a base chamber that is hydraulically connected to a water conduit of the water supply apparatus and which has an opening to the surroundings; and
a sealing device installed in the base chamber and configured to close off the opening of the base chamber from the surroundings,
wherein the sealing device has a wall area with a predetermined breaking point which has a compressive strength that is lower than the compressive strength of wall areas of other components of the water supply apparatus which, in an operating state, enclose cavities that can be filled with water, and which separate the cavities that can be filled with water from the surroundings,
wherein the sealing device has a filter seat configured to accommodate and hold a water filter.

4. The water supply apparatus of claim 3, further comprising:
a filter chamber,
wherein the base apparatus has an inlet and an outlet for routing water through the base chamber,
wherein in the base apparatus, the filter chamber is flow-wise arranged between the inlet and the outlet and forms part of the base chamber,
wherein the filter seat is arranged within the filter chamber such that the water filter accommodated by the filter seat is held within the filter chamber.

5. The water supply apparatus of claim 3, wherein the wall area with the predetermined breaking point is provided adjacent to the filter seat.

6. The water supply apparatus of claim 3, wherein the sealing device has an elongated extension and an environmental chamber open to the surroundings and which is coaxial to the filter seat in a longitudinal direction, and wherein the wall area with the predetermined breaking point is arranged between the filter seat and the environmental chamber.

7. The water supply apparatus of claim 3, wherein the filter seat has a cylindrical form, and wherein the wall area with the predetermined breaking point forms a front side of the filter seat.

8. The water supply apparatus of claim 3, wherein the wall area with the predetermined breaking point has a weakening in the form of a reduced wall strength compared to other sections forming the filter seat.

9. A water supply apparatus, comprising:
a mixing apparatus configured to mix, in a mixing container, water carried in the mixing apparatus;
a base apparatus having a base chamber that is hydraulically connected to a water conduit of the water supply apparatus and which has an opening to the surroundings; and
a sealing device installed in the base chamber and configured to close off the opening of the base chamber from the surroundings,
wherein the sealing device has a wall area with a predetermined breaking point which has a compressive strength that is lower than the compressive strength of wall areas of other components of the water supply apparatus which, in an operating state, enclose cavities that can be filled with water, and which separate the cavities that can be filled with water from the surroundings,
wherein the mixing apparatus is a pressure equalization and mixing apparatus,
wherein the pressure equalization and mixing apparatus has a mixing device and a pressure equalization device,
wherein the mixing device serves to mix the water carried within the mixing device,
wherein the pressure equalization device serves to restrict a pressure increase in the water, and
wherein the mixing device and the pressure equalization device are integrated in a container unit and have a common housing absorbing and carrying the water.

10. The water supply apparatus according to claim 9, wherein the pressure equalization device is arranged at least partly within the mixing device, wherein the mixing device has a water absorbing mixing volume, wherein the pressure equalization device has an air absorbing pressure equalization volume, and wherein the mixing volume and the pressure equalization volume are adjacent to one another and are at least partly separated from one another by a common partition wall.

\* \* \* \* \*